(12) United States Patent
Klemen et al.

(10) Patent No.: US 11,130,456 B2
(45) Date of Patent: Sep. 28, 2021

(54) LOW PRESSURE GENERATOR FOR GAS TURBINE ENGINE

(71) Applicant: Rolls-Royce North American Technologies, Inc., Indianapolis, IN (US)

(72) Inventors: Donald Klemen, Carmel, IN (US); Michael J. Armstrong, Avon, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 528 days.

(21) Appl. No.: 15/590,581

(22) Filed: May 9, 2017

(65) Prior Publication Data

US 2017/0335795 A1  Nov. 23, 2017

Related U.S. Application Data

(60) Provisional application No. 62/338,201, filed on May 18, 2016, provisional application No. 62/338,204, (Continued)

(51) Int. Cl.
*F01D 15/10* (2006.01)
*F02C 7/32* (2006.01)
(Continued)

(52) U.S. Cl.
CPC ............. B60R 16/03 (2013.01); B64D 27/10 (2013.01); F01D 15/10 (2013.01); F01D 17/02 (2013.01); F01D 17/24 (2013.01); F02C 3/04 (2013.01); F02C 3/10 (2013.01); F02C 7/06 (2013.01); F02C 7/275 (2013.01); F02C 7/32 (2013.01); F02C 7/36 (2013.01); F02K 3/06 (2013.01);
(Continued)

(58) Field of Classification Search
CPC ...... B64D 2027/026; F01D 15/10; F02K 3/06
See application file for complete search history.

(56) References Cited

U.S. PATENT DOCUMENTS 2,803,943 A    8/1957  Rainbow et al.
3,720,060 A *  3/1973  Davies ................. F01D 7/00
                                                415/129

(Continued)

FOREIGN PATENT DOCUMENTS

DE    102010014968 A1   10/2011
EP        798454 A2     10/1997
(Continued)

OTHER PUBLICATIONS

Mar-Dustrial Sales, Inc., "Shaft Misalignment 101: Radial, Angular and Axial", Jul. 25, 2011, https://www.mardustrial.com/blog/falk-couplings-and-shaft-misalignment-101-radial-angular-and-axial-07-25-2011/ (Year: 2011).*

(Continued)

*Primary Examiner* — Ehud Gartenberg
*Assistant Examiner* — Henry Ng
(74) *Attorney, Agent, or Firm* — Barnes & Thornburg LLP

(57) ABSTRACT

A gas turbine engine and methods of operation include a low pressure electric motor-generator arranged for selective operation in a generator mode to generate electrical power or a drive mode to assist rotation of a low pressure drive shaft of the engine.

19 Claims, 10 Drawing Sheets

Related U.S. Application Data filed on May 18, 2016, provisional application No. 62/338,205, filed on May 18, 2016, provisional application No. 62/433,576, filed on Dec. 13, 2016.

(51) Int. Cl.

| | |
|---|---|
| *F02C 3/10* | (2006.01) |
| *F02K 3/06* | (2006.01) |
| *F02C 3/04* | (2006.01) |
| *F02C 7/06* | (2006.01) |
| *F02C 7/275* | (2006.01) |
| *F02C 7/36* | (2006.01) |
| *F01D 17/02* | (2006.01) |
| *F01D 17/24* | (2006.01) |
| *B60R 16/03* | (2006.01) |
| *H02K 7/18* | (2006.01) |
| *H02K 5/173* | (2006.01) |
| *H02K 9/19* | (2006.01) |
| *B64D 27/10* | (2006.01) |
| *H02P 9/04* | (2006.01) |

(52) U.S. Cl.
CPC ......... *H02K 5/1732* (2013.01); *H02K 7/1823* (2013.01); *H02K 9/19* (2013.01); *H02P 9/04* (2013.01); *F05D 2220/323* (2013.01); *F05D 2220/36* (2013.01); *F05D 2220/76* (2013.01); *H02K 2203/09* (2013.01)

(56) References Cited

U.S. PATENT DOCUMENTS

| | | | | |
|---|---|---|---|---|
| 3,807,815 A | * | 4/1974 | Kasabian | B23Q 1/265 384/517 |
| 4,214,457 A | * | 7/1980 | Wade | F01D 5/026 464/99 |
| 4,497,171 A | | 2/1985 | Corrigan et al. | |
| 4,804,288 A | * | 2/1989 | Tiernan, Jr. | F01D 5/026 403/24 |
| 5,182,960 A | * | 2/1993 | Chary | F16H 1/14 74/417 |
| 5,309,029 A | * | 5/1994 | Gregory | F01D 15/10 244/58 |
| 5,867,979 A | | 2/1999 | Newton et al. | |
| 6,064,123 A | | 5/2000 | Gislason et al. | |
| 6,729,140 B2 | | 5/2004 | Care et al. | |
| 6,851,267 B2 | | 2/2005 | Bruno et al. | |
| 6,914,344 B2 | | 7/2005 | Franchet et al. | |
| 7,484,354 B2 | | 2/2009 | Stretton | |
| 8,198,744 B2 | | 6/2012 | Kern et al. | |
| 8,424,280 B2 | | 4/2013 | Moore et al. | |
| 9,121,351 B2 | | 9/2015 | Ress, Jr. et al. | |
| 9,657,646 B2 | | 5/2017 | Wotzak | |
| 2005/0132693 A1 | | 6/2005 | Macfarlane et al. | |
| 2006/0101804 A1 | | 5/2006 | Stretton | |
| 2006/0225431 A1 | | 10/2006 | Kupratis | |
| 2006/0260323 A1 | | 11/2006 | Moulebhar | |
| 2007/0035137 A1 | * | 2/2007 | Matsukuma | F01D 15/10 290/52 |
| 2007/0137219 A1 | | 6/2007 | Linet et al. | |
| 2007/0151258 A1 | | 7/2007 | Gaines et al. | |
| 2008/0120980 A1 | | 5/2008 | Gemin et al. | |
| 2008/0148881 A1 | | 6/2008 | Moniz et al. | |
| 2008/0265580 A1 | | 10/2008 | Sharp | |
| 2009/0007568 A1 | | 1/2009 | Eccles et al. | |
| 2009/0175716 A1 | | 7/2009 | Vetters | |
| 2009/0288421 A1 | * | 11/2009 | Zeiner | F02C 3/10 60/792 |
| 2009/0290976 A1 | | 11/2009 | Suciu et al. | |
| 2012/0133150 A1 | * | 5/2012 | Dooley | F01D 15/10 290/1 A |
| 2013/0296092 A1 | * | 11/2013 | Beckner | F16D 25/0638 475/127 |
| 2014/0150401 A1 | * | 6/2014 | Venter | F02C 7/36 60/39.45 |
| 2014/0224063 A1 | * | 8/2014 | Alford | F04D 25/0686 74/606 R |
| 2014/0274420 A1 | * | 9/2014 | Blewett | F16H 57/0426 464/16 |
| 2014/0356135 A1 | | 12/2014 | French et al. | |
| 2014/0367970 A1 | * | 12/2014 | Van Der Ham | F16C 35/00 290/52 |
| 2016/0047319 A1 | * | 2/2016 | Gieras | F02C 7/36 60/788 |
| 2016/0069458 A1 | * | 3/2016 | Patino Crespo | F16F 15/134 464/51 |
| 2017/0276182 A1 | * | 9/2017 | Davies | B64C 13/34 |
| 2017/0297727 A1 | * | 10/2017 | Niergarth | B64D 27/02 |
| 2018/0016989 A1 | * | 1/2018 | Abe | F02K 3/06 |

FOREIGN PATENT DOCUMENTS

| | | |
|---|---|---|
| EP | 2412939 A1 | 2/2012 |
| GB | 1127659 A | 9/1968 |
| GB | 2444838 A | 6/2008 |
| WO | 1995002120 A1 | 1/1995 |

OTHER PUBLICATIONS

Extended European Search Report, European Application No. 17170031.3-1610, dated Oct. 13, 2017, 9 pages.

\* cited by examiner

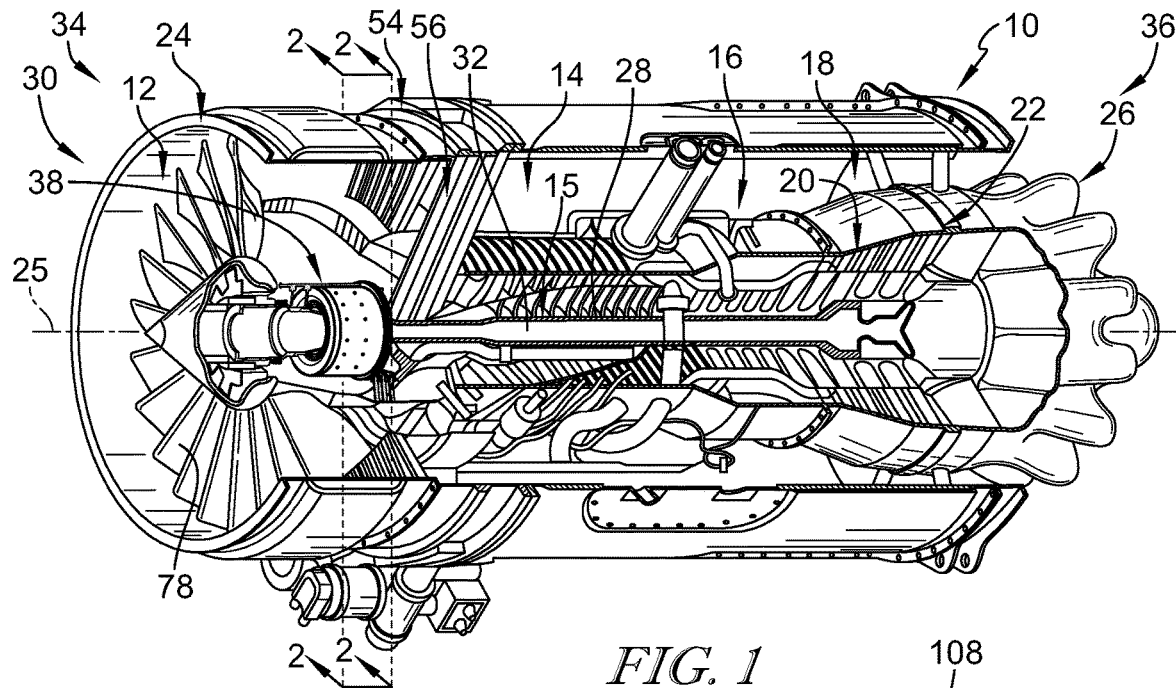
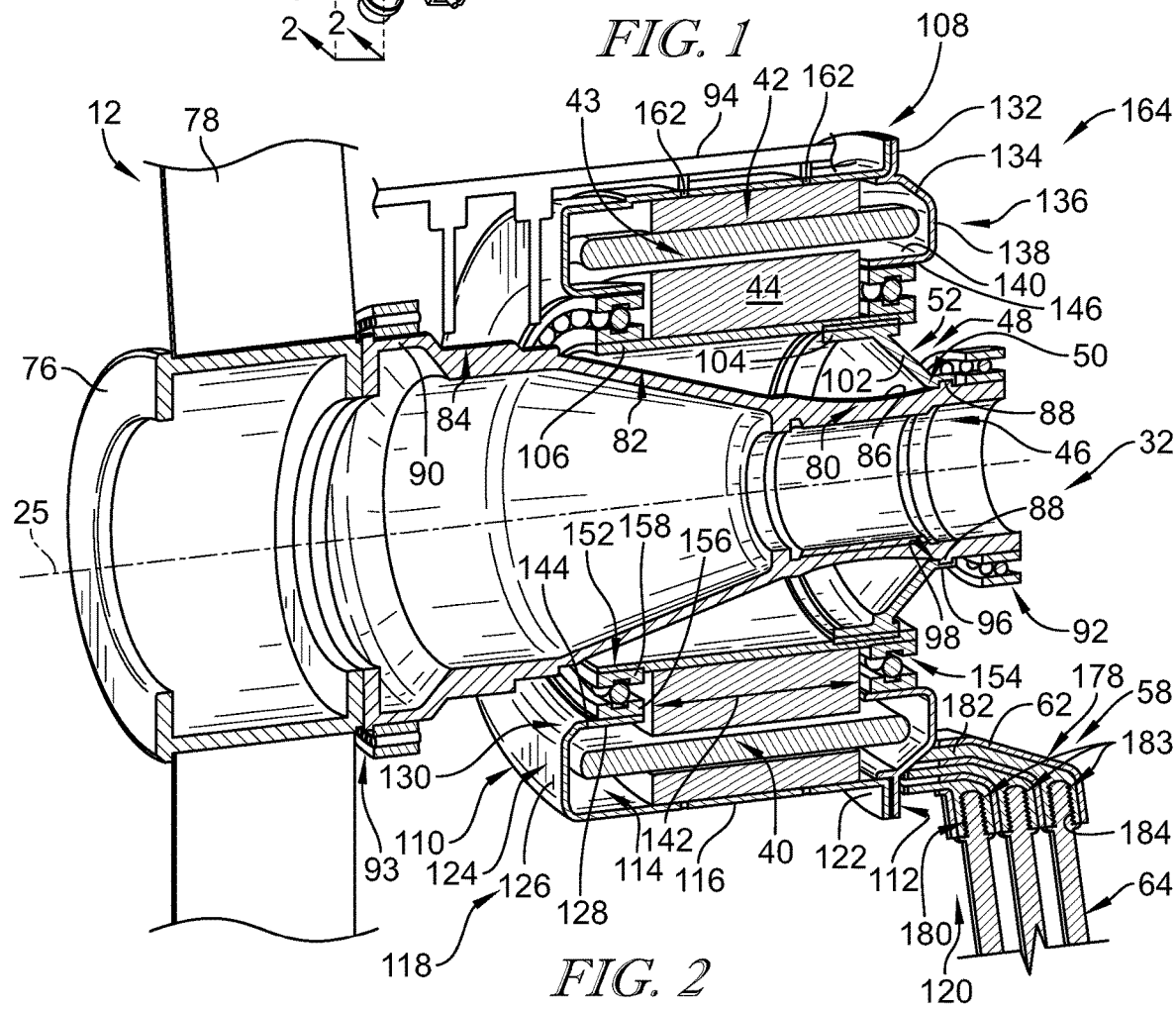

LOW PRESSURE GENERATOR FOR GAS TURBINE ENGINE

CROSS REFERENCE TO RELATED APPLICATIONS

This application claims priority to and the benefit of U.S. Provisional Patent Application Nos. 62/338,201, filed 18 May 2016; 62/338,204, filed 18 May 2016; 62/338,205, filed 18 May 2016; and 62/433,576, filed 13 Dec. 2016, the disclosures of which are now expressly incorporated herein by reference.

FIELD OF THE DISCLOSURE

The present disclosure relates generally to gas turbine engines, and more specifically to auxiliary electric power generators of gas turbine engines.

BACKGROUND

Gas turbine engines are used to power aircraft, watercraft, electrical generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, or propeller. Portions of the work extracted from the turbine can be used to drive various subsystems such as generators.

SUMMARY

The present disclosure may comprise one or more of the following features and combinations thereof. According to an aspect of the present disclosure, a turbofan gas turbine engine for use in an aircraft may include a low pressure spool including a fan rotor arranged at a forward end of the engine, a low pressure turbine rotor arranged at an aft end of the engine, a low pressure drive shaft extending along an axis and rotationally coupling the fan rotor to receive driven rotation from the low pressure turbine rotor, a high pressure spool including a compressor rotor, a high pressure turbine rotor, and a high pressure drive shaft extending along the axis and rotationally coupling the compressor rotor to receive driven rotation from the high pressure turbine rotor, and an electric generator including generator core having a stator arranged about the low pressure drive shaft and a generator rotor rotationally coupled to the low pressure drive shaft, the electric generator being positioned axially between the fan rotor and the compressor rotor along the axis.

In some embodiments, the low pressure drive shaft may include a fan shaft and a quill shaft having a base rotationally coupled with the fan shaft and a flange extending radially from the base for rotational connection with the generator rotor of the electric generator.

In some embodiments, the base of the quill shaft forms a quill connection with the fan shaft that may be rotationally fixed but may allow relative movement between the quill shaft, and wherein the generator rotor is mounted to a rotor hub forms another quill connection with the quill shaft.

In some embodiments, the base of the quill shaft may include a number of splines extending radially inward for connection with a number of splines of the fan shaft to rotationally couple the quill shaft and the fan shaft.

In some embodiments, the fan shaft may include a first bearing and a second bearing each arranged to support the fan shaft for rotation about the axis, and the electric generator is arranged axially between the first and second bearings.

In some embodiments, the electric generator may include a generator housing having a shaft opening defined axially therethrough, the generator housing including a can receptacle and a cover attached to an end of the can receptacle, the generator housing defining an internal cavity for receiving the stator of the generator core.

In some embodiments, the rotor of the electric generator may be attached to an inner shaft that is rotationally coupled to the fan shaft, and the electric generator includes a bearing disposed between the generator housing and the inner shaft for supporting rotation of the inner shaft independently from the fan shaft.

In some embodiments, the electric generator may comprise a motor-generator selectively operable in a first mode to generate electrical power from driven rotation and in a second mode to drive rotation low pressure drive shaft by receiving electrical power.

In some embodiments, the high pressure turbine spool may include an accessory shaft coupled to the high pressure drive shaft to receive driven rotation.

According to another aspect of the present disclosure, a turbofan gas turbine engine for propulsion of an aircraft may include a low pressure spool including a fan rotor arranged at a forward end of the engine, a low pressure turbine rotor arranged at an aft end of the engine, a low pressure drive shaft extending along an axis and rotationally coupling the fan rotor to receive driven rotation from the low pressure turbine rotor, a high pressure spool including a compressor rotor, a high pressure turbine rotor, and a high pressure drive shaft extending along the axis and rotationally coupling the compressor rotor to receive driven rotation from the high pressure turbine rotor, and a low pressure generator including a generator core having a stator arranged about the low pressure drive shaft and a generator rotor rotationally coupled to the low pressure drive shaft.

In some embodiments, the low pressure drive shaft may include a fan shaft and a quill shaft having a base rotationally attached to the fan shaft and a flange extending radially from the base to rotationally connect the fan shaft to the low pressure generator.

In some embodiments, the base of the quill shaft may include a number of splines extending radially inward for connection with a number of splines of the fan shaft to rotationally couple the quill shaft and the fan shaft while permitting movement therebetween.

In some embodiments, the fan shaft may include a first bearing and a second bearing arranged to support the fan shaft for rotational motion about the axis, and the low pressure generator is arranged axially between the first and second bearings.

In some embodiments, the low pressure generator may include a generator housing having a shaft opening defined axially therethrough, the generator housing including a can receptacle and a cover attached to an end of the can receptacle, the generator housing defining an internal cavity for receiving the stator of the generator core.

In some embodiments, the generator rotor may be mounted to an inner shaft that is rotationally coupled to the fan shaft, and the low pressure generator includes a first bearing disposed between the generator housing and the inner shaft for supporting rotation of the inner shaft independently from the fan shaft.

In some embodiments, the first bearing may contact the can receptacle, and the low pressure generator may include a second bearing disposed between the cover and the inner shaft for supporting rotation of the inner shaft independently from the fan shaft.

In some embodiments, the can receptacle may define a number of lubrication pathways extending radially therethrough for communicating cooling oil to the stator of low pressure generator.

In some embodiments, the low pressure generator may include a motor-generator selectively operable in a first mode to generate electrical power from driven rotation, and in a second mode to drive rotation by receiving electrical power.

In some embodiments, the high pressure turbine spool may include an accessory shaft coupled to the high pressure drive shaft to receive driven rotation.

According to another aspect of the present disclosure, a turbofan gas turbine engine for propulsion of an aircraft may include a turbofan assembly for providing air to the engine, the turbofan assembly including a fan shaft extending along an axis and adapted to receive driven rotation about the axis from a low pressure turbine rotor of the engine and a fan rotor rotationally coupled to the fan shaft for rotation, a compressor assembly adapted to compress air received from the turbofan assembly, the compressor assembly including a compressor shaft extending along the axis and adapted to receive driven rotation about the axis and a compressor rotor rotationally fixed to the compressor shaft, and a low pressure generator including a stator arranged about the fan shaft and a rotor rotationally coupled to the fan shaft, the low pressure generator being positioned axially between the fan rotor and the compressor.

These and other features of the present disclosure will become more apparent from the following description of the illustrative embodiments.

BRIEF DESCRIPTION OF THE DRAWINGS

FIG. 1 is a perspective view of an illustrative embodiment of a turbofan gas turbine engine with a portion cut away to show that the gas turbine engine includes a low pressure turbine spool and a high pressure spool, and showing that the low pressure spool includes a fan disposed on a forward end of the engine, a low pressure turbine rotor disposed on an aft end of the engine, and a low pressure drive shaft that extends along an axis between the forward and aft ends and is connected to each of the fan rotor and the low pressure turbine rotor to transfer rotational drive from the lower pressure turbine rotor to the fan, and showing that the high pressure spool includes a compressor, a high pressure turbine rotor, and a high pressure drive shaft that extends concentrically with the low pressure drive shaft and is connected to each of the high pressure turbine rotor and the compressor to transfer rotational drive from the high pressure turbine rotor to the compressor, and showing that the engine includes a low pressure electric motor-generator that is positioned between the fan and the compressor along the axis and is rotationally coupled to the low pressure drive shaft for selective operation as a generator to generate electric power from rotation of the low pressure drive shaft or as an electric motor to assist rotation of the low pressure drive shaft;

FIG. 2 is a perspective view of a portion of the turbofan gas turbine engine of FIG. 1 in cross-section taken along the cross-sectional plane 2-2 showing that the low pressure drive shaft includes a fan shaft and a quill shaft that is rotationally coupled to the fan shaft by a quill connection that allows movement of the fan shaft relative to the quill shaft while transferring rotational drive, and showing that the low pressure motor-generator includes a generator core having a rotor rotationally coupled with the quill shaft and a stator arranged outside of the rotor and fixed against rotation relative to the rotor, and showing that the low pressure motor-generator includes a generator housing positioned radially outside of the quill shaft and bearings disposed radially between the generator housing and the quill shaft, and a number of coolant pathways for distributing lubricant to the low pressure motor-generator;

DETAILED DESCRIPTION OF THE DRAWINGS

Figure 3:
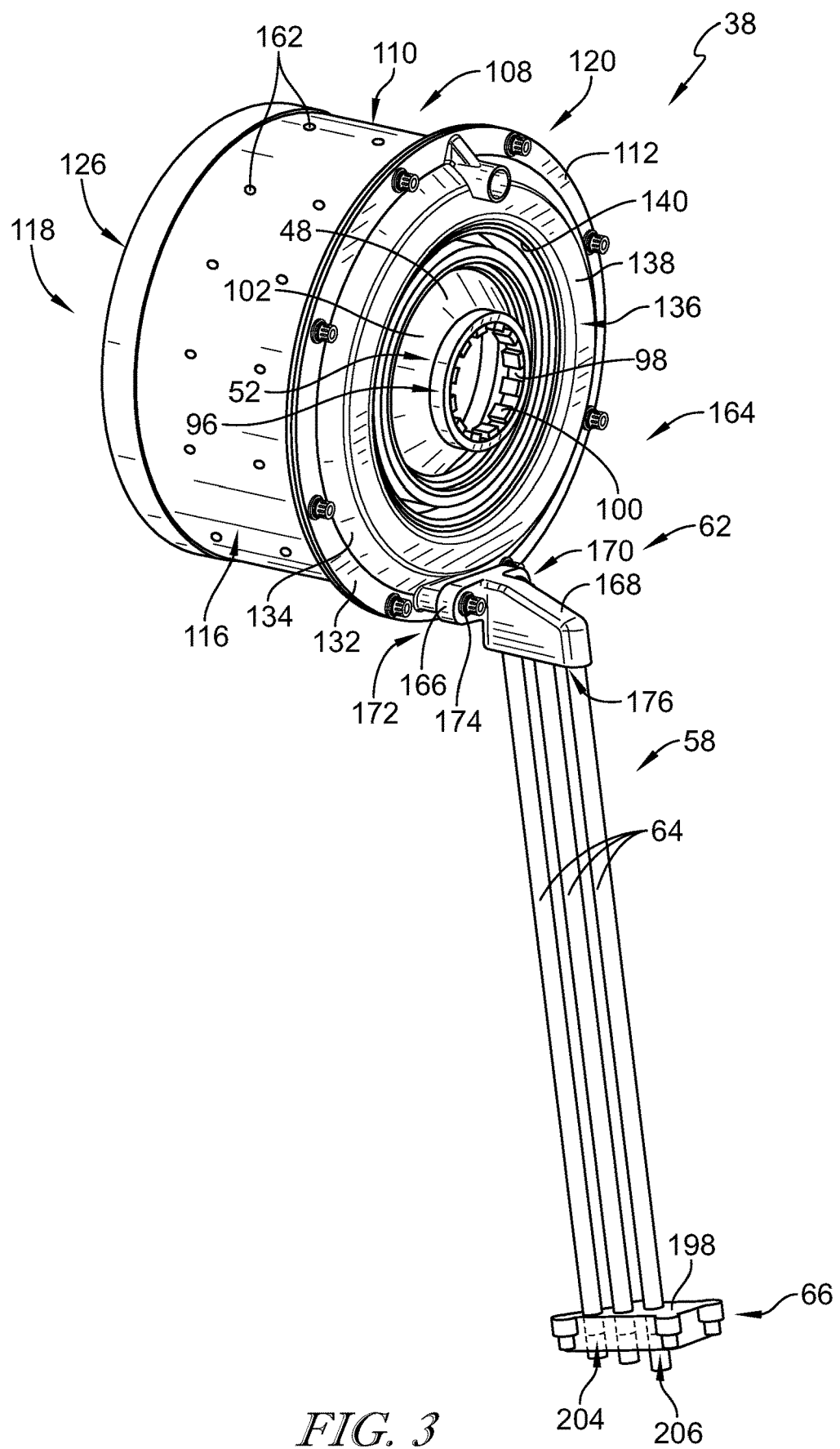
FIG. 3 is a perspective view of the low pressure motor-generator of FIG. 2 showing that the generator housing includes a can receptacle and a cover attached to the aft end of the can receptacle, and showing that the turbofan gas turbine engine includes an electrical assembly connected to the cover of generator housing and extending radially outward from the low pressure motor-generator for connection with other loads.

For the purposes of promoting an understanding of the principles of the disclosure, reference will now be made to a number of illustrative embodiments illustrated in the drawings and specific language will be used to describe the same.

Gas turbine engines may be adapted for various uses, such as to propel aircraft, watercraft, and/or for power generation. The electrical power demands on gas turbine engines adapted for such uses are rapidly increasing due to the growing number and power requirement of processors, actuators, and accessories. However, drawing additional electric power from high pressure (HP) driven electric generators can limit the operation of the gas turbine engine, for example, by decreasing certain operating margins at peak demand.

The present disclosure includes descriptions of gas turbine engines that include low pressure (LP) motor-generators configured to supply of electric power. In certain adapted uses of the engines, for example, when adapted for use in an aircraft, the present disclosure includes devices, systems, and methods for integration of low pressure (LP) motor-generators into turbofan gas turbine engines. Motor-generators include devices that can be selectively operated in a first mode to generate electricity for use in other systems and in a second mode to drive mechanical rotation by consumption of electrical power. Coordinated operation of low pressure (LP) and/or high pressure (HP) motor-generators in response to various operational conditions promotes operational flexibility and power management optimization.

As shown in FIG. 1, an illustrative turbofan gas turbine engine 10 includes a fan 12, a compressor 14 having a compressor rotor 15, a combustor 16, and a turbine 18 having a high pressure (HP) turbine rotor 20 and a low pressure (LP) turbine rotor 22, housed within a casing 24 as shown in FIG. 1. The fan 12 draws air into the compressor 14 that compresses and delivers the air to the combustor 16. The combustor 16 mixes fuel with the compressed air from the compressor 14 and combusts the mixture. The hot, high-pressure exhaust products of the combustion reaction in the combustor 16 are directed into the turbine 18 to cause rotation of the HP and LP turbine rotors 20, 22 about an axis 25 to drive the compressor 14 and the fan 12, respectively.

In the illustrative embodiment, the gas turbine engine 10 includes a high pressure (HP) spool 26 illustratively comprising the compressor rotor 15, the HP turbine rotor 20, and a high pressure (HP) drive shaft 28 that extends along the axis 25 to couple the compressor 14 for rotation with the HP turbine rotor 20. In the illustrative embodiment, the gas turbine engine 10 includes a low pressure (LP) spool 30 illustratively comprising the fan 12, the LP turbine rotor 22, and a low pressure drive shaft 32 that extends along the axis 25 to couple the fan 12 for rotation with the LP turbine rotor 22. In the illustrative embodiment, the drive shafts 28, 32 are concentric shafts that extend along the axis 25 between forward 34 and aft ends 36 of the engine 10.

In the illustrative embodiment as shown in FIG. 1, the engine 10 includes a low pressure (LP) motor-generator 38 positioned between the fan 12 and the compressor 14 along the axis 25. As shown in FIG. 2, the LP motor-generator 38 illustratively includes a motor-generator core 40 having a stator 42 fixed against rotation relative to the LP drive shaft 32 and a rotor 44 coupled to the LP drive shaft 32 for rotation. The stator 42 is illustratively includes a number of stator windings 43 positioned radially outward of the rotor 44, such that each is illustratively arranged in electromagnetic communication. In some embodiments, the motor-generator core 40 may include any suitable type and/or arrangement of electro-mechanical motor and/or generator. The LP motor-generator 38 is illustratively adapted for selective operation between a generation mode to generate electrical power from rotation of the LP turbine 22 and in a drive mode to receive electrical power for applying rotational force to the LP drive shaft 32.

As shown in FIG. 2, the LP drive shaft 32 illustratively includes a fan shaft 46 and a quill shaft 48 forming quill connections with each of the fan shaft 46 and a rotor hub 106 (on which the rotor 44 is illustratively mounted) to connect the rotor 44 for rotation with the fan shaft 46 while permitting relative movement therebetween. The quill shaft 48 illustratively includes a base 50 coupled to the fan shaft 46 and a flange 52 extending from the base 50 for connection with the rotor hub 106. The rotor 44 of the LP motor generator 38 is illustratively mounted on the rotor hub 106, which is supported by bearings 152, 154 (as discussed below), while being connected for rotation with the LP drive shaft 32 through the quill shaft 48. In some embodiments, a single quill connection may be used to rotationally connect the LP drive shaft 32 with the rotor 44 while permitting relative movement.

Figure 6:
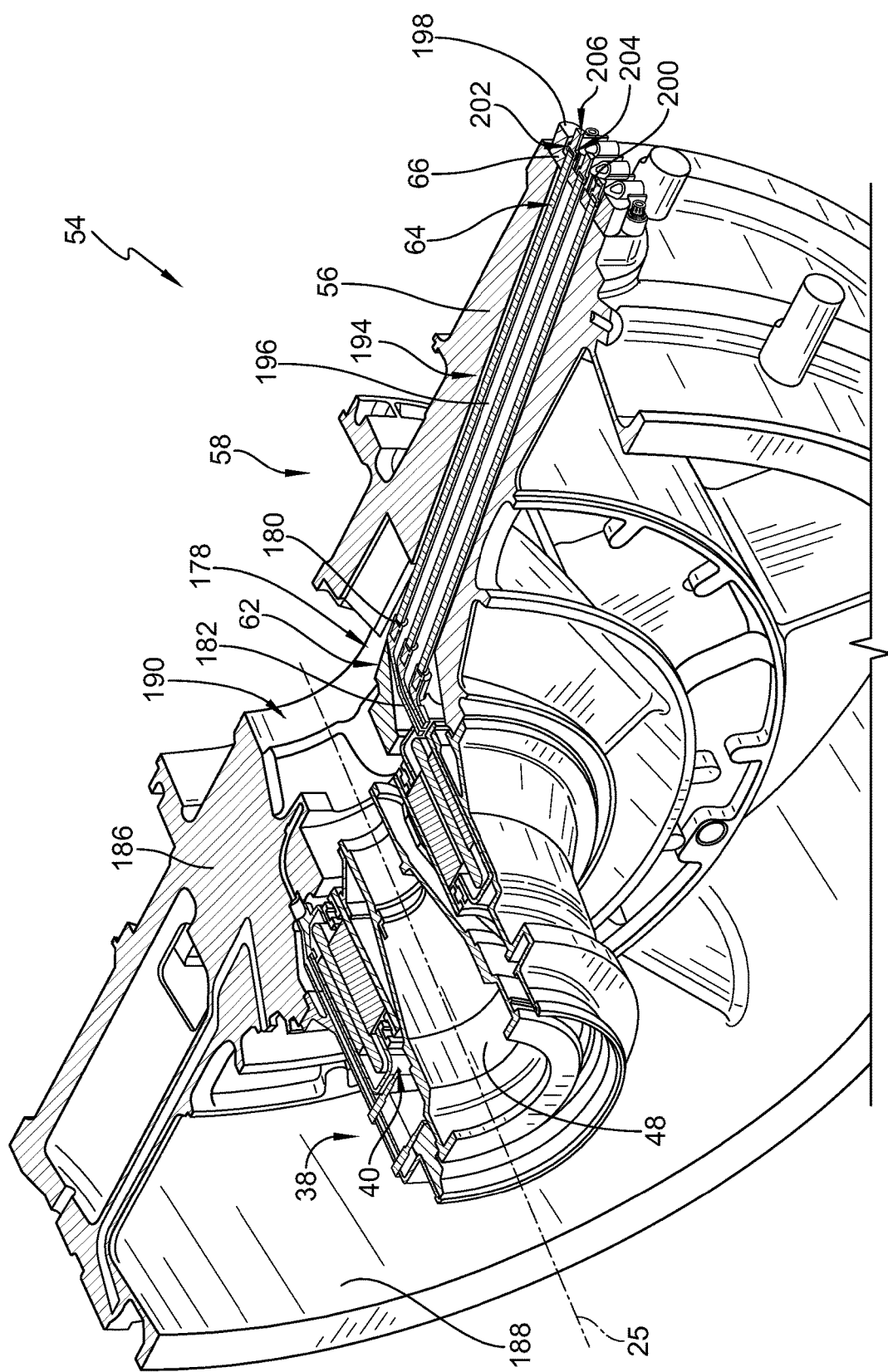
FIG. 6 is a perspective cross-sectional view of the support frame of FIG. 6 taken along the line 6-6 and showing that the electrical assembly of the LP motor-generator includes a connector electrically connected to the stator and attached to the housing of the low pressure motor-generator, a terminal base attached to an outer collar of the support frame, and a number of busbars that extend between and connect to each of the connector and the terminal base, and showing that the busbars extend radially through one of the struts to electrically connect the connector to the terminal base.

As best shown in FIGS. 3 and 6, the LP motor generator 38 illustratively includes an electrical assembly 58 that electrically connects the LP motor-generator 38 to electrical loads of the engine 10. The electrical assembly 58 illustratively includes a connector 62 attached to the LP motor-generator 38, a set of three busbars 64 each having an end coupled with the connector 62, and a terminal base 66 coupled to an opposite end of each of the busbars 64. As shown in FIG. 6, the busbars 64 illustratively extend radially outward from the LP motor generator 38 through a strut 56 of a support frame 54 of the engine 10 for connection with the terminal base 66 to communicate electric power to and from the LP motor-generator 38.

As shown in FIGS. 7-14, the turbofan gas turbine engine 10 illustratively includes a high pressure (HP) motor-generator 68. The HP motor-generator 68 is illustratively embodied as being coupled to an auxiliary shaft 69 to receive driven rotation from the HP drive shaft 28. The HP motor-generator 68 is illustratively adapted for selective operation in a generation mode to generate electrical power from rotation of the HP turbine rotor 20 or in a drive mode to receive electrical power to assist rotation of the HP drive shaft 28.

In the illustrative embodiment, the turbofan gas turbine engine 10 includes a power control module 70 for governing electric power distribution within the engine 10. The power control module 70 is illustratively electrically connected to each of the LP motor-generator 38 and HP motor-generator 68. The power control module 70 is adapted to selectively receive and distribute electric power between the LP and HP motor-generators 38, 68, electric power users 72 (such as an airframe of a vehicle (aircraft) in adapted use of the engine 10), and an energy storage device 74 (such as a battery), according to operational conditions of the engine 10 (and/or the vehicle).

Figure 13:
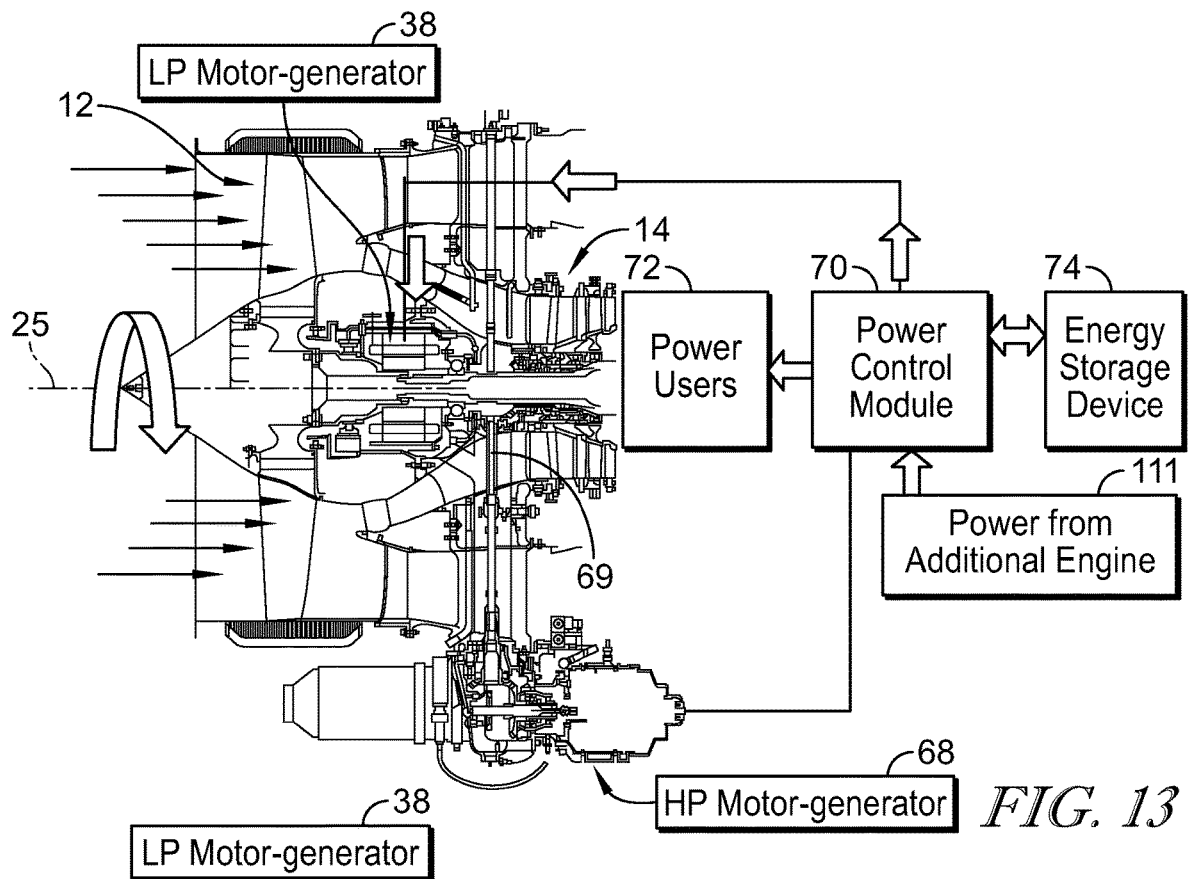
FIG. 13 is a partially diagrammatic view of the turbofan gas turbine engine of FIGS. 1 and 7-12 showing that the power control module is electrically connected to a second high pressure motor-generator of a second gas turbine engine for individual selective operation between generation and drive modes to permit selective distribution of power between the engine and the second engine, and showing by example that the power control module determines that operational conditions do not meet threshold efficiencies, and in response to determination that operational conditions do not meet a threshold efficiency of the low pressure spool of the engine, the power control module receives electric power from the second engine and operates the low pressure motor-generator in the drive mode.

As explained in detail below, the power control module 70 governs electric power management based on the operational conditions of the engine 10. Under some conditions, the power control module 70 can direct electric power to the HP motor-generator 68 to assist rotation of the HP drive shaft 28 and/or reduce load on the HP turbine rotor 20. Under some conditions, the power control module 70 directs electric power to the LP motor-generator 38 to assist rotation of the LP drive shaft 32 and/or reduce load on the LP turbine rotor 22. Under some conditions, the power control module 70 communicates electrical power between one or both of the motor-generators 38, 68 and the energy storage device 74, and/or from any of the motor-generators 38, 68 and the energy storage device 74 to electric power users 72. As shown in FIG. 13, the power control module 70 can be electrically connected to a second engine 111 to govern electric power management between engines 10, 111.

Returning now to FIGS. 1 and 2, the fan 12 is illustratively disposed at the forward end 34 of the engine 10. The fan 12 is illustratively attached to a fan shaft 46 of the LP drive shaft 32 for rotation about axis 25. The fan 12 illustratively includes a fan rotor 76 and fan blades 78 that extend radially from the fan rotor 76. The fan rotor 76 illustratively rotates the fan blades 78 about axis 25 to direct air axially into the engine 10.

In the illustrative embodiment as shown in FIG. 2, the fan shaft 46 of the LP drive shaft 32 is embodied as a hollow shaft that extends through the LP motor-generator 38 for connection with the fan rotor 76. The fan shaft 46 is illustratively configured for splined connection with the LP drive shaft 32, but in some embodiments may be integral with the LP drive shaft 32. The fan shaft 46 of the LP drive shaft 32 receives driven rotation from the LP turbine rotor 22.

As shown in FIG. 2, the fan shaft 46 illustratively includes a first section 80 having an outer diameter, a tapered section 82 that extends from the first section 80 along the direction of the axis 25 towards the forward end 34, and a hub 84 extending from the tapered section 82 along the axis 25 for connection with the fan 12.

In the illustrative embodiment, the first section 80 of the fan shaft 46 is illustratively coupled with the LP turbine rotor 22 to receive driven rotation. The first section 80 illustratively includes an outer surface 86 having splines 88 that each extend along the direction of the axis 25 and have a radial height for connection with the quill shaft 48 (also shown in FIG. 3). The outer surface 86 aftward of the splines 88 illustratively contacts a shaft bearing 92 to provide rotational support to the fan shaft 46.

As shown in FIG. 2, the first section 80 is illustratively positioned to extend axially though the LP motor-generator 38 to connect with the tapered section 82. The tapered section 82 illustratively includes a tapered outer diameter that increases in size along the axial direction moving towards the forward end 34. The tapered section 82 is illustratively positioned to extend axially through the LP motor-generator 38 to connect with the hub 84.

As shown in FIG. 2, the hub 84 illustratively includes a tiered section 90 adapted for contact with a shaft bearing 93 to support the LP drive shaft 32 for rotation within the engine 10. Each of the shaft bearings 92, 93 are illustratively arranged to receive lubricant from a lubricant distribution system 94 of the engine 10. The tiered section 90 illustratively includes a constant outer diameter that contacts a shaft bearing 93 to reduce friction of the fan shaft 46 during rotation.

Figure 4:
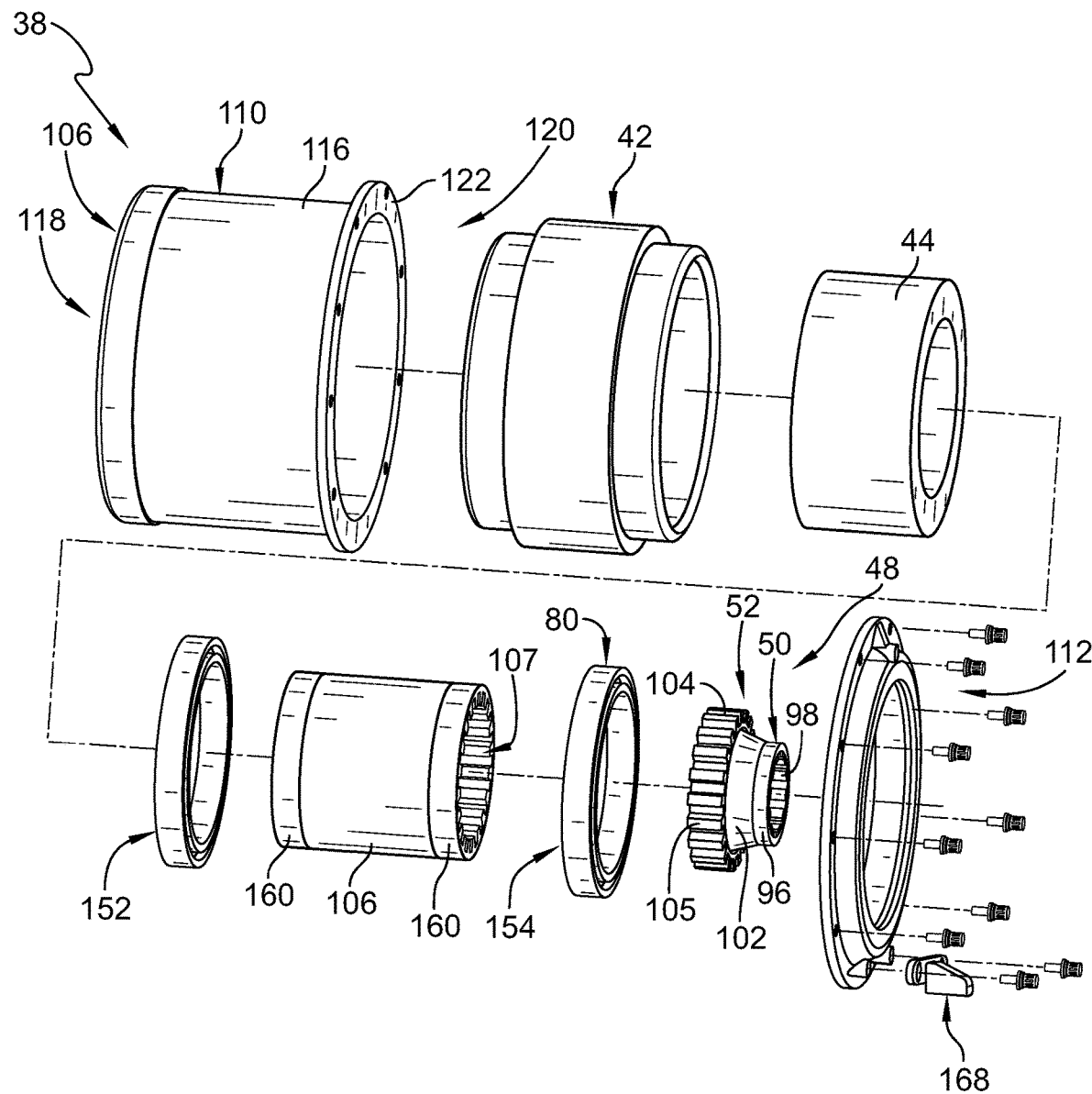
FIG. 4 is an exploded perspective view of the low pressure motor generator of FIGS. 2 and 3 showing that the generator housing includes an interior cavity for housing the low pressure motor-generator core and a shaft opening therethrough for receiving the low pressure drive shaft, and showing that the quill shaft includes splines extending inwardly to form the quill connection with the fan shaft.

As shown in FIG. 2, the fan shaft 46 is coupled with the quill shaft 48 for rotation. The quill shaft 48 is illustratively embodied as a hollow coupler forming a quill connection with the fan shaft 46 and the rotor hub 106 on which the rotor 44 is mounted. The base 50 of the quill shaft 48 illustratively includes a hollow cylinder 96 having an inner surface 98 and splines 100 that each extend along the direction of the axis 25 and have a radial height (also shown in FIG. 4). The splines 100 of the quill shaft 48 are illustratively arranged complimentary to the splines 88 of the first section 80 of the fan shaft 46 to form the quill connection to allow relative movement between the fan shaft 46 and the quill shaft 48 while providing rotational coupling therebetween. The quill connection provides an offset from the fan shaft 46 to accommodate non-concentric rotation of the fan shaft 46 during a fan imbalance and/or blade off event, and/or axial misalignment therebetween.

The quill shaft 48 illustratively includes the flange 52 that extends radially outward from the base 50 for rotational connection with the LP motor-generator 38. The flange 52 illustratively includes a neck 102 extending radially from the base 50 and a stem 104 connected to the neck 102 and partitioned radially spaced apart from the base 50. The stem 104 illustratively forms another quill connection to the rotor hub 106 of the LP motor generator 38 that supports the rotor 44 for rotation with the LP drive shaft 32. The stem 104 illustratively includes splines 105 formed on an outer surface thereof and complimentary to splines 107 form on an inner surface of the rotor hub 106 to form the quill connection to allow relative movement between the rotor hub 106 and the quill shaft 48 while providing rotational coupling therebetween.

Referring to FIG. 3, the LP motor-generator 38 illustratively includes a housing 108 having a receptacle 110 and a cover 112 attached to the receptacle 110 and together defining an interior cavity 114 (as shown in FIG. 2) for receiving the motor-generator core 40. As best shown in FIG. 2, the receptacle 110 illustratively includes an annular shell 116 extending along the direction of the axis 25 between a forward end 118 and an aft end 120, a mount flange 122 attached to the aft end 120 of the annular shell 116, and an overhang 124 attached to the forward end 118 of the annular shell 116.

As best shown in FIG. 2, the overhang 124 includes a limb 126 that extends radially inward from the forward end 118 of the annular shell 116 and an extension 128 connected to a radially inward end 130 of the limb 126. The extension 128 illustratively extends from the limb 126 parallel to the axis 25 towards the aft end 120 spaced apart from the annular shell 116 by the radial length of the limb 126 to define a portion of the interior cavity 114. The mount flange 122 is illustratively embodied as an annular flange extending perpendicularly to the axis 25 to receive connection of the cover 112.

The cover 112 illustratively includes a cover flange 132 for connection to the mount flange 122 of the receptacle 110, an annular section 134 extending from the cover flange 132 towards the aft end 36 of the engine 10, and an overhang 136 extending from the annular section 134. In the illustrative embodiment, the annular section 134 has a tapered outer diameter increasing in size move towards the forward end 34 along the axis 25. The overhang 136 of the cover 112 illustratively includes a limb 138 extending radially inward from the aft end of the annular section 134 and an extension 140 connected to the radially inward end 142 of the limb 138. The extension 140 illustratively extends from the limb 138 parallel to the axis 25 towards the cover flange 132 spaced apart from the annular section 134 to define a portion of the interior cavity 114 of the housing 108.

In the illustrative embodiment as shown in FIG. 2, the extensions 128, 140 are radially aligned and define a gap 142 axially therebetween. When the motor-generator core 40 is received within the interior cavity 114, the rotor 44 is illustratively positioned within the gap 142 in electromagnetic communication with the stator 42. The extensions 128, 140 each respectively include an inner surface 144, 146 and an outer surface 148, 150 adapted to support a respective bearing 152, 154 of the LP motor-generator 38.

The bearings 152, 154 are each illustratively embodied as a roller ball bearing having an outer race 156 that contacts the inner surface 144, 146 of the respective extension 128, 140 and an inner race 158 that contacts an outer surface 160 of the inner shaft 106 on which the rotor 44 is mounted. In the illustrative embodiment, the rotor 44 is coupled to the inner shaft 106 at a position between the bearings 152, 154 for rotation with the fan shaft 46.

As shown in FIG. 2, the turbofan gas turbine engine 10 illustratively includes the lubricant distribution system 94 embodied as lubricant conduits formed within portions of the casing 24 for communicating lubricant, such as oil, to the bearings 92, 93, 152, 154 and the stator 42. In the illustrative embodiment, the housing 108 of the LP motor-generator 38 includes lubrication pathways 162 defined therein. The lubrication pathways 162 illustratively extend radially through the annular shell 116 to provide communication of lubricant from the lubricant distribution system 94 to the stator 42.

As shown in the illustrative embodiment of FIG. 3, the electrical assembly 58 is electrically connected to the LP motor-generator 38 to provide three electrically isolated busses for 3-phase power communication. In some embodiments, the electrical assembly 58 may be configured to communicate any suitable number of phase power. The connector 62 of the electrical assembly 58 is illustratively attached to the cover 112 at an aft side 164 of the LP motor-generator 38. The connector 62 includes a mount 166 connected to the cover 112 and a body 168 that extends from the mount 166 to connect with the busbars 64.

In the illustrative embodiment, the mount 166 extends generally for a length between opposite ends 170, 172 thereof and includes a mount hole 174 defined therethrough on each end 170, 172 to receive a fastener for connection to the cover 112. The mount 166 is illustratively arranged generally tangential to the annular section 134. The body 168 illustratively extends from the mount 166 at a position between the ends 170, 172 and in a direction perpendicular to the length of the mount 166. The body 168 illustratively includes a side 176 facing radially outward from the axis 25 having three recesses 176 defined therein for connection with one of the busbars 64.

As best show in FIGS. 2 and 6, the connector 62 illustratively includes three electrical connections 178 each comprising a socket 180 disposed within the body 168 and wires 182 connected to the socket 180. Each socket 180 is illustratively embodied as a receptacle formed of conductive material and including interior threads 183 complimentary to exterior threads 184 of the busbars 64 to form a threaded connection between the connector 62 and the busbars 64. In some embodiments, the connector 62 may include a floating connection with the busbars 64 to allow thermal movement therebetween while maintaining electrical connection.

In the illustrative embodiment as shown in FIG. 2, each of the wires 182 is illustratively attached to one of the sockets 180 and is isolated from the other wires 182. The wires 182 each illustratively extend through the body 168 and the mount 166 for connection with the stator 42 of the LP motor-generator 38. The busbars 64 are illustratively electrically connected to the LP motor-generator 38 via the electrical connections 178.

Figure 5:
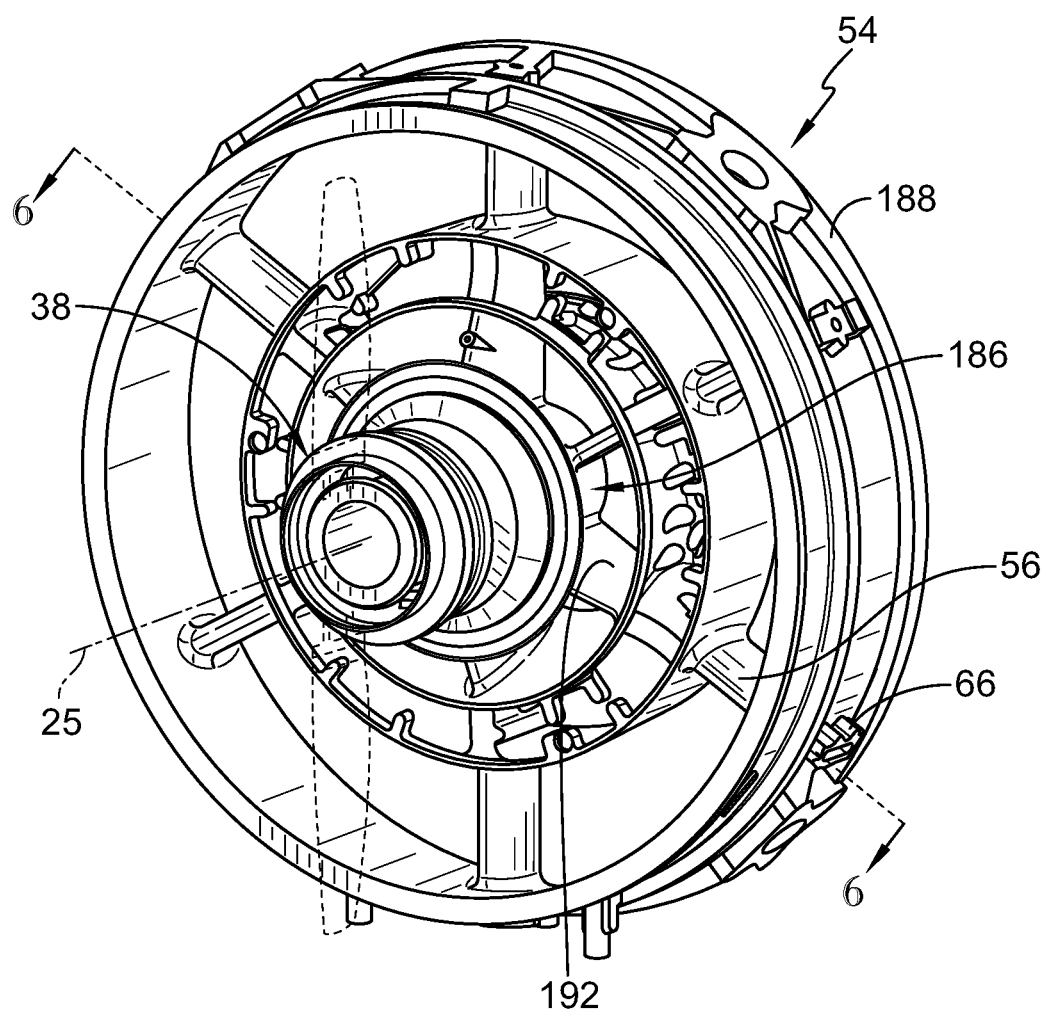
FIG. 5 is a perspective view of a support frame of the turbofan gas turbine engine of FIG. 1 showing that the support frame includes a number of struts extending radially to connect with a number of support collars of the support frame, and showing that the low pressure motor-generator is positioned between the fan and the support frame along the axis.

Referring now to the illustrative embodiment as shown in FIGS. 5 and 6, the LP motor-generator 38 is positioned forward of the support frame 54 of the engine 10 along the axis 25. The support frame 54 illustratively includes a hub 186 surrounding the axis 25 for receiving the LP motor-generator 38, a collar 188 arranged radially outward of the hub 186, and the strut 56 extending radially between the hub 186 and the collar 188.

As shown in FIG. 6, the hub 186 illustratively defines an interior space 190 therethrough to receive the aft end of the LP motor-generator 38. The LP drive shaft 32 penetrates through the interior space 190 of the hub 186 for connection with the LP motor-generator 38. The strut 56 illustratively connects with the hub 186 at an angular position of the connector 62 relative to the axis 25 that is complimentary, and illustratively equal, to the angular position about the axis 25.

As best shown in FIG. 5, the strut 56 illustratively includes a smooth outer surface 192 to minimize flow resistance. The strut 56 illustratively includes an interior cavity 194 defined therein that extends radially between the hub 186 and the collar 188. The interior cavity 194 illustratively receives the busbars 64 therethrough to extend between the connector 62 and the terminal base 66. Positioning the busbars 64 within the strut 56 provides physical protection while permitting conductive cooling of the busbars 64 by air passed over the strut 56.

In the illustrative embodiment, the busbars 64 are each embodied as a rod formed of electrically conductive material, for example, copper. The busbars 64 each illustratively include the exterior threads 184 disposed on one end for fixed connection to one of the connector 62 and the terminal base 66, and a cylindrical shape on the opposite end to slidably connect with the other of the connector 62 and the terminal base 66 to form a floating connection to accommodate thermal expansion. The busbars 64 are illustratively embodied to be secured within the interior cavity 194 surrounded with potting compound 196 to electrically isolate the busbars 64 from each other. The busbars 64 illustratively extend radially between the connector 62 and the terminal base 66 at an angle relative to a plane that is perpendicular to the axis 25.

As best shown in FIG. 6, the terminal base 66 is illustratively attached to the collar 188 at a position spaced apart from the connector along the axis 25. The terminal base 66 illustratively includes a body 198 having three slots 200 defined radially therethrough each including a terminal socket 202 arranged therein to slidably receive one of the busbars 64 therein for electrical connection. The terminal sockets 202 are each illustratively embodied to include a hollow cylinder section 204 disposed within the body 198 and a stem 206 extending from the hollow cylinder section 204 radially outside of the body 198 as a terminal post for connection to electrical loads of the engine 10. The terminal sockets 202 are illustratively formed of electrically conductive material to communicate electric power between the LP motor-generator 38 and electrical loads of the engine 10. In some embodiments, the busbars 64 may be fixedly connected to the terminal base 66 and have a floating connection with the connector 62.

Referring now to the illustrative embodiments of FIGS. 7-14, the gas turbine engine 10 includes the power control module 70 that is electrically connected to each of the LP motor-generator 38 and HP motor-generator 68. As mentioned above, the power control module 70 governs electric power management of the engine 10 based on the operational conditions of the engine 10.

The power control module 70 is illustratively embodied as a main control unit including a processor 208, a memory device 210 that stores instructions for execution by the processor 208, communications circuitry 212 adapted to communicate signals with various components of engine 10 as directed by the processor 208, and power distribution circuitry 214 adapted to communicate electric power with any of the motor-generators 38, 68, power users 72, and the energy storage device 74 as directed by the processor 208. The power control module 70 determines operational conditions of the engine based on signals received from various engine components and selectively operates the LP and HP motor-generators 38, 68 based on the determined operational conditions.

Figure 7:
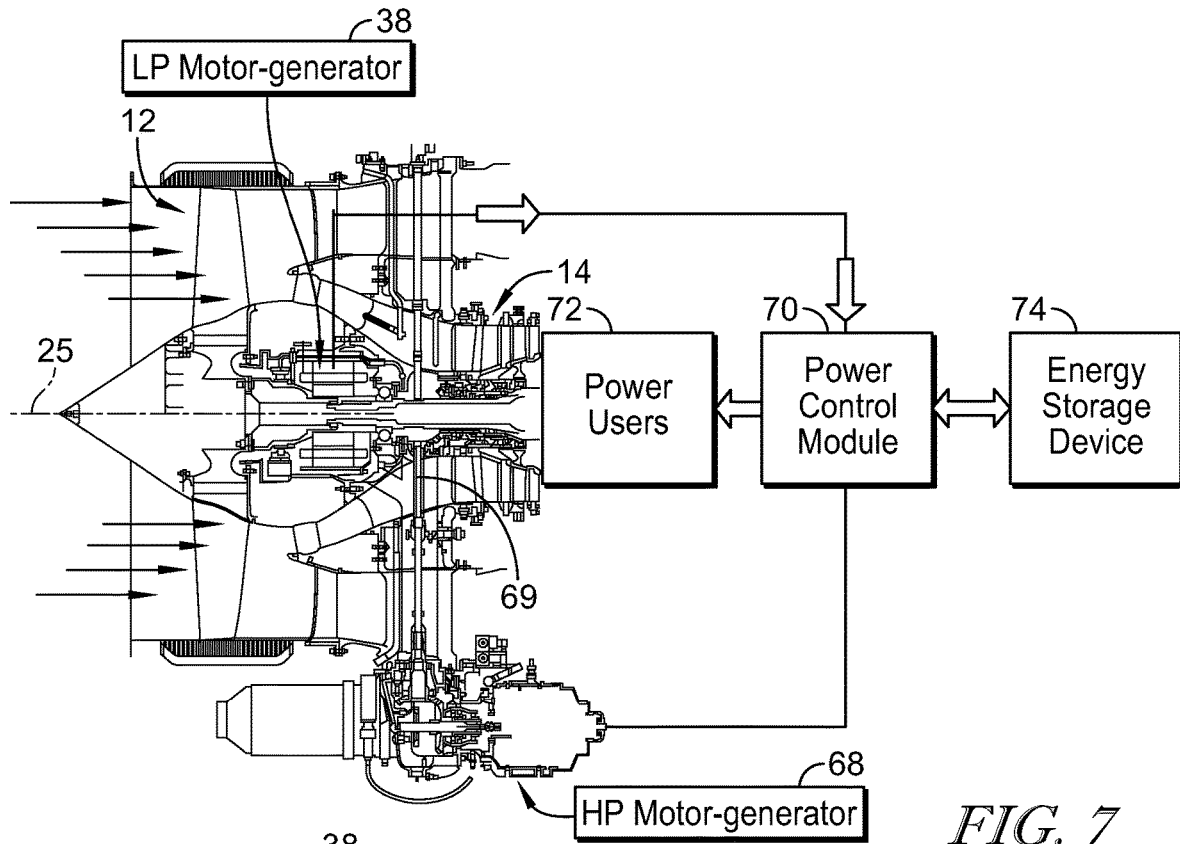
FIG. 7 is a partially diagrammatic view of the turbofan gas turbine engine of FIG. 1 showing that the engine includes a high pressure motor-generator adapted to be driven for rotation by the high pressure drive shaft, and showing that the engine includes a power control module that is electrically connected to each of the low pressure motor-generator and the high pressure motor-generator and is arranged for selectively operating each of the low pressure and high pressure motor-generators independently between the generation modes and the drive modes, and showing that the power control module is connected to communicate electrical power with an optional energy storage device, and showing by example that the power control module determines that steady state operational conditions exist, and in response to steady state conditions, the power control module operates the low pressure motor-generator in the generation mode and distributes electrical power generated by the low pressure motor-generator to an electrical user and selectively exchanges electrical power with the energy storage device.

In the illustrative embodiment as shown in FIG. 7, the power control module 70 determines that the current operational conditions are steady state conditions. The steady state conditions illustratively include operational conditions in which the loads on the HP spool and the LP spool are within normal operating ranges such that no electrically-driven force of rotation on the drive shafts 28, 32 is provided. Examples of such steady state conditions when the turbofan gas turbine engine 10 is adapted for use in an aircraft include ground idle, flight idle conditions, and/or flight cruise conditions.

In the illustrative embodiment, in response to steady state conditions, the power control module 70 is configured to operate the LP motor-generator 38 in the generation mode. The power control module 70 illustratively directs electric power generated by the LP motor-generator 38 to the power users 72 and selectively communicates electric power with the energy storage device 74. The power control module 70 is illustratively embodied to selectively communicate electric power with the energy storage device 74 based on the operational conditions and the power storage levels of the energy storage device 74.

Figure 8:
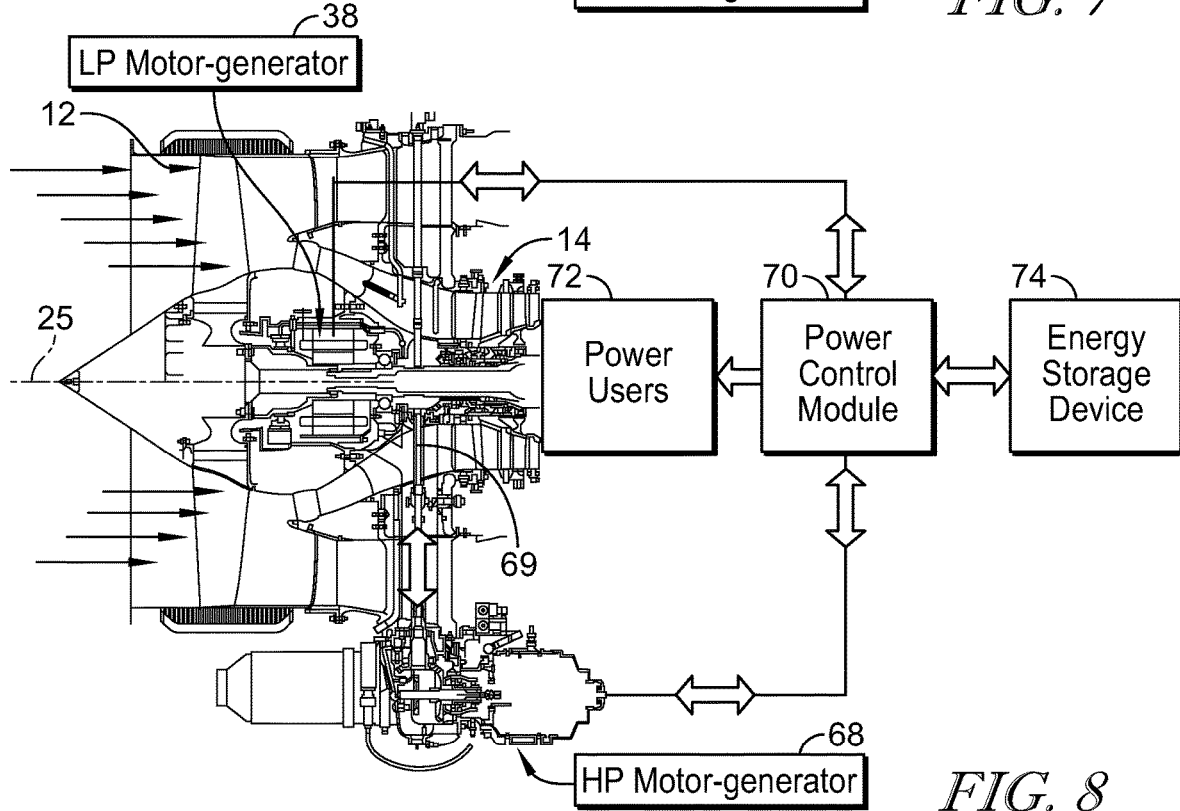
FIG. 8 is a partially diagrammatic view of the turbofan gas turbine engine of FIGS. 1 and 7 showing by example that the power control module can exchange power between low pressure motor-generator and high pressure motor-generator to adjust loads applied to low pressure and high pressure spools in order to improve engine efficiency.

In the illustrative embodiment as shown in FIG. 8, the power control module 70 determines that the current operational conditions include low efficiency conditions. Low efficiency conditions include efficiencies of either of the HP spool 26 or LP spool 30 that are less than respective predetermined threshold efficiencies. In the illustrative embodiment, the efficiency of the HP spool 26 includes a fuel efficiency of the HP spool 26 as represented by an operating point of the compressor 14 along an operating curve as reflected on a plot of pressure ratio versus corrected flow.

In the illustrative embodiment, in response to determination of low efficiency conditions, the power control module 70 can selectively direct electric power generated from the LP motor-generator 38 in the generator mode to the HP motor-generator 68 in the drive mode to adjust the operating point of the compressor 14 along the operating curve to improve fuel efficiency of the HP spool 26. In the illustrative embodiment, the power control module 70 can selectively direct electric power generated from the HP motor-generator 68 in the generator mode to the LP motor-generator 38 in the drive mode to adjust the operating point of the compressor 14 along the operating curve to improve fuel efficiency of the HP spool 26. Thus, the power control module can selectively adjust the operating point of the compressor 14 along the its operating curve to improve engine fuel efficiency. In some embodiments, such low efficiency conditions when the turbofan gas turbine engine 10 is adapted for use in an aircraft include conditions in which any of the fuel efficiency and/or heat rate are less than a predetermined fuel efficiency and/or predetermined heat rate for either of the HP spool 26 or the LP spool 30.

Figure 9:
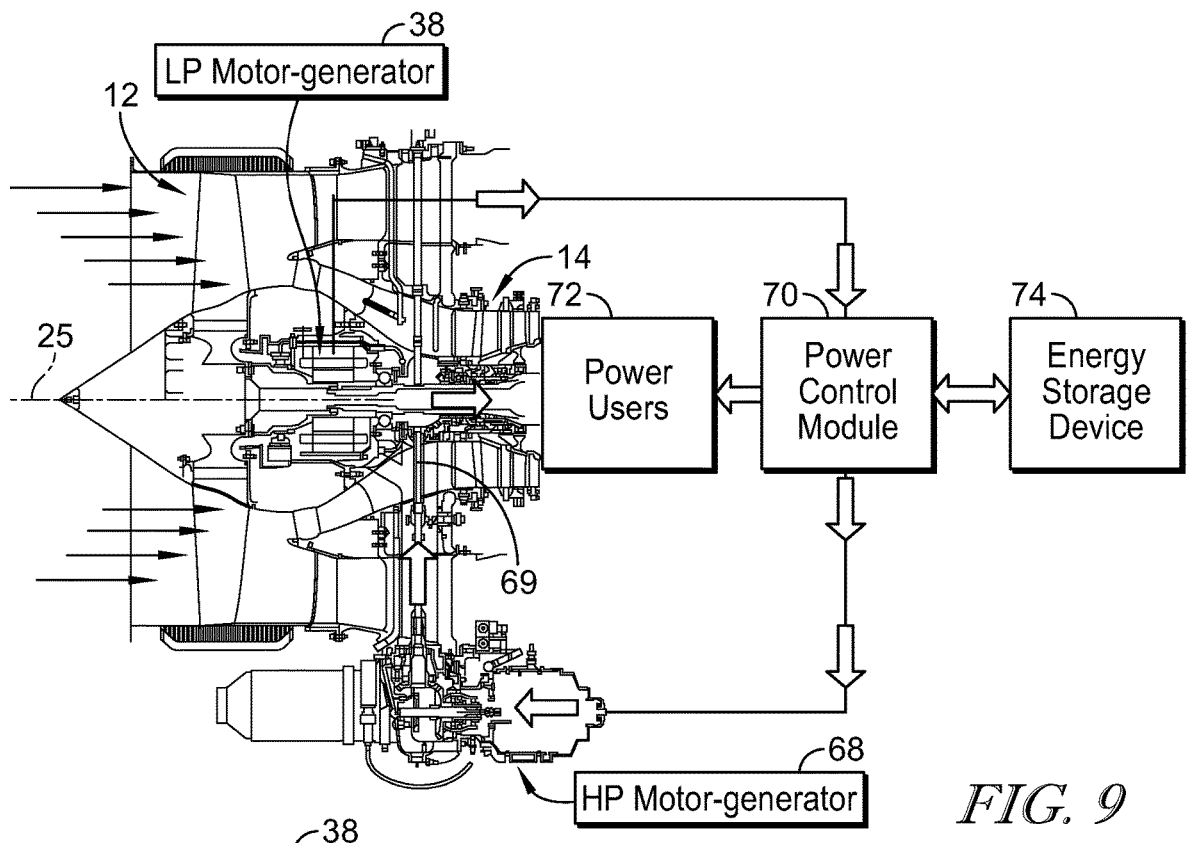
FIG. 9 is a partially diagrammatic view of the turbofan gas turbine engine of FIGS. 1, 7, and 8 showing by example that the power control module determines that high demand operational conditions exist and in response the power control module operates the low pressure motor-generator in the generation mode and operates the high pressure motor-generator in the drive mode to assist rotation of the high pressure drive shaft and reduce load on the high pressure spool, and showing that the power control module selectively exchanges electrical power with the energy storage device.

In the illustrative embodiment as shown in FIG. 9, the power control module 70 determines that the operational conditions include high demand operational conditions. The high demand operational conditions illustratively include low compressor surge margin conditions and/or disruption of rotation of the fan 12. Low compressor surge margin illustratively includes the amount of operating margin between the current compressor operating conditions and compressor surge conditions being below a predetermined threshold value. Examples of such high demand operational conditions when the turbofan gas turbine engine 10 is adapted for use in an aircraft include high altitude flight, fan 12 disruption events (e.g., fan rotor and/or blade damage from ice, birds, debris, etc.).

In the illustrative embodiment, in response to high demand operational conditions, the power control module 70 is configured to operate the LP motor-generator 38 in the generation mode and to direct electric power to the HP motor-generator 68 in the drive mode. For example, when the high demand operational conditions exist due to low compressor surge margin, the power control module 70 illustratively reduces the load on the HP Spool 26 by assisting rotation of the HP drive shaft 32 with the LP motor generator 38, and increasing the operating margin between the current compressor operating conditions and compressor surge conditions.

Figure 10:
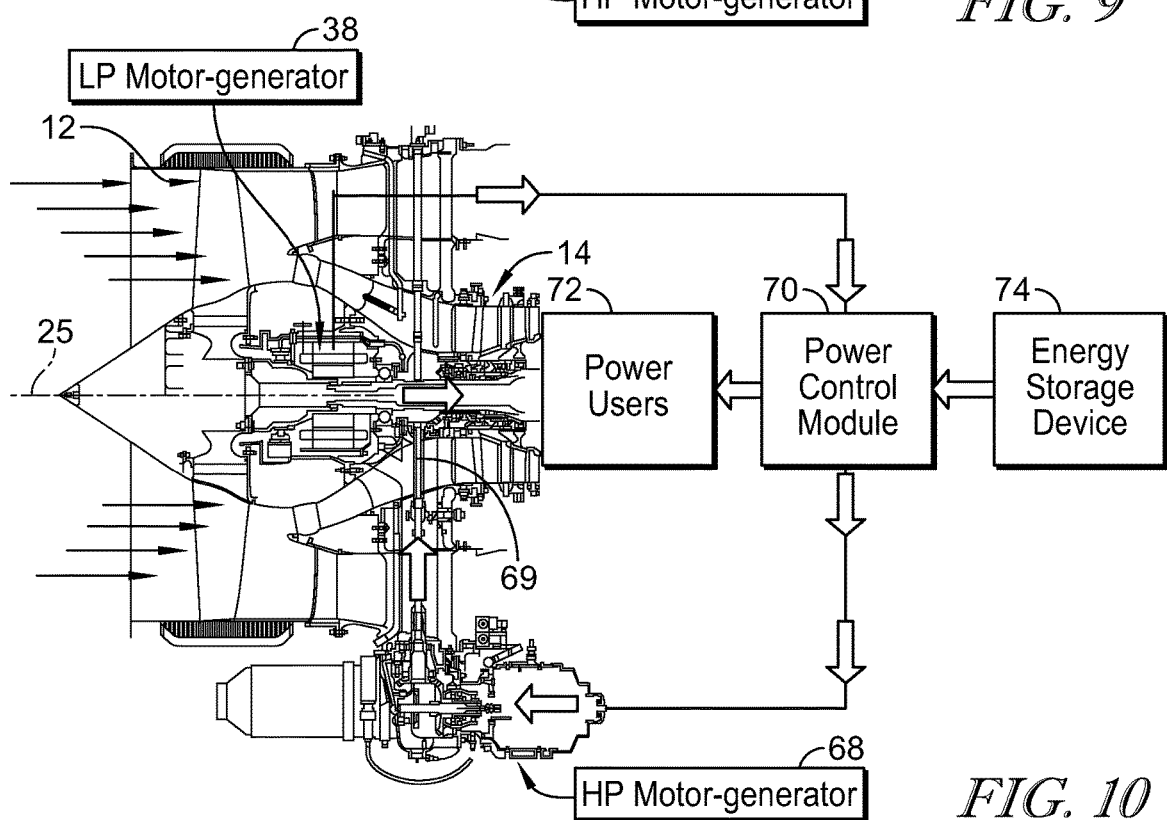
FIG. 10 is a partially diagrammatic view of the turbofan gas turbine engine of FIGS. 1 and 7-9 showing by example that the power control module determines that in-flight restart operational conditions exist and in, the power control module operates the low pressure motor-generator in the generation mode and operates the high pressure motor-generator in the drive mode to assist in-flight restart of the engine, and showing that the power control module receives electrical power from the energy storage device.

In the illustrative embodiment as shown in FIG. 10, the power control module 70 determines that the operational conditions include hot restart. When the engine 10 is adapted for use in an aircraft, hot restart operational conditions include in-flight restart conditions. Under such in-flight restart conditions, some ram air flow is illustratively received by the fan 12 because the aircraft is currently in flight. In response to hot restart operational conditions, the power control module 70 is illustratively configured to operate the LP motor-generator 38 in the generation mode and to direct electric power to the HP motor-generator 68 in the drive mode to assist restart of the engine 10. The power control module 70 illustratively directs electric power from the power storage device 74 to the HP motor-generator 68.

Figure 11:
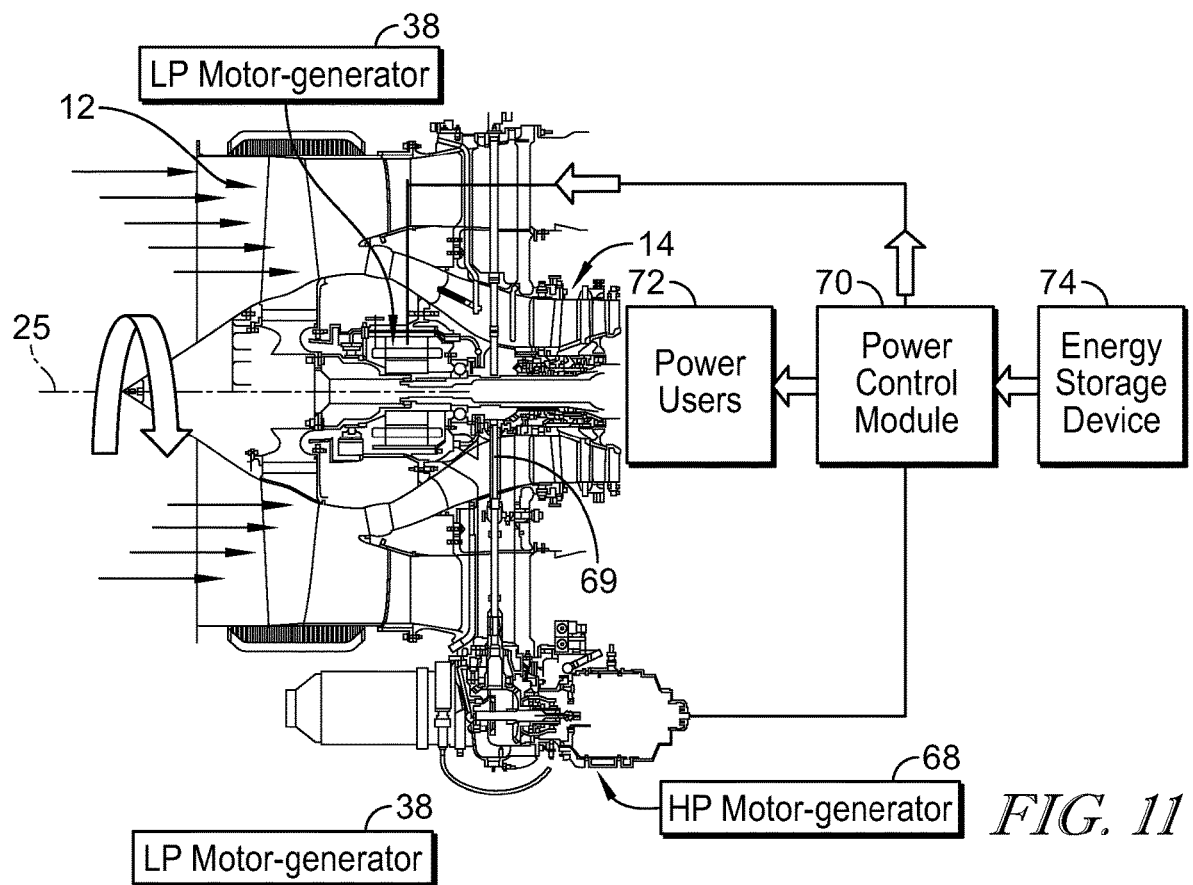
FIG. 11 is a partially diagrammatic view of the turbofan gas turbine engine of FIGS. 1 and 7-10 showing by example that the power control module determines that loss of engine power operational conditions exist and in response, the power control module selectively operates the low pressure motor-generator in the drive mode to provide thrust assist.

In the illustrative embodiment as shown in FIG. 11, the power control module 70 determines that the operational conditions include loss of engine power. Loss of engine power illustratively includes an operational shut down of the engine 10, where operational shut down includes elective shut down and unexpected shut down. In response to determination of loss of engine power operational conditions, the power control module 70 is configured to selectively operate the LP motor-generator 38 in the drive mode to selectively rotate the LP spool 30 to provide thrust assist. The power control module 70 illustratively directs electric power from the power storage device 74 to the LP motor-generator 38. When the engine 10 is adapted for use in an aircraft, thrust assist can provide light and/or pulse thrust for additional stability control, navigational control, range extension, and/or landing assist.

Figure 12:
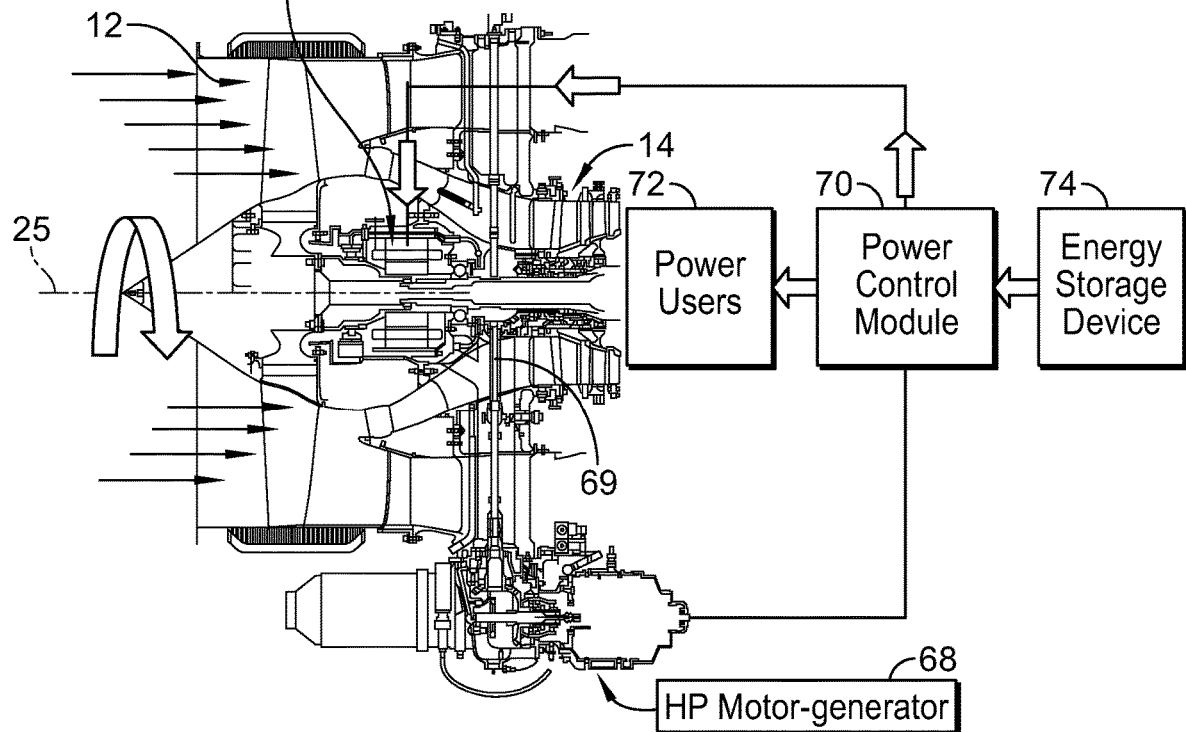
FIG. 12 is a partially diagrammatic view of the turbofan gas turbine engine of FIGS. 1 and 7-11 showing by example that the power control module determines that hot engine off operational conditions exist in which the engine is desirably shut down but remains at relatively high temperature and in response the power control module operates the low pressure motor-generator in the drive mode to provide electrically driven rotation of the fan to provide air to the engine for cooling engine components and expelling fumes.

In the illustrative embodiment as shown in FIG. 12, the power control module 70 determines that operational conditions include hot engine off conditions. Hot engine off conditions illustratively include engine 10 being electively shut down while an operating temperature remains above a threshold temperature. In the illustrative embodiment, the operating temperature includes a lubricant temperature. In response to determination of hot engine off conditions, the power control module 70 operates the LP motor-generator in the drive mode to drive air through the engine 10. Passing air through the engine 10 can cool engine components and can provide pressure to prevent accumulation of exhaust products into certain areas.

In the illustrative embodiment as shown in FIG. 13, the power control module 70 is electrically connected with other turbo fan gas turbine engines 111, illustratively three other engines 111. Engines 111 are illustratively embodied as similar to engine 10 and each of the engines 10, 111 are illustratively adapted for use in the aircraft. In some embodiments, the engines 111 may be any type of engine adapted for use in the aircraft and capable of generating electric power. The power control module 70 illustratively determines that electric high bypass conditions exist in engine 10. Electric high bypass conditions illustratively include disengagement of engine 10 and one of the other engines 111 but with electrically driven rotation of their fans 12 to maintain high fan area.

In the illustrative embodiment, in response to determination of electric high bypass conditions, the power control module 70 operates the LP motor-generator 38 of the engines 10, 111 in the drive mode to electrically drive rotation of their respective fans 12. The power control module 70 illustratively directs electric power from any of the operating engines 111 and the energy storage device 74 to the disengaged engines 10, 111. Such selective electric high bypass operation promotes efficiency and flexibility across engines 10, 111 and their platforms.

Figure 14:
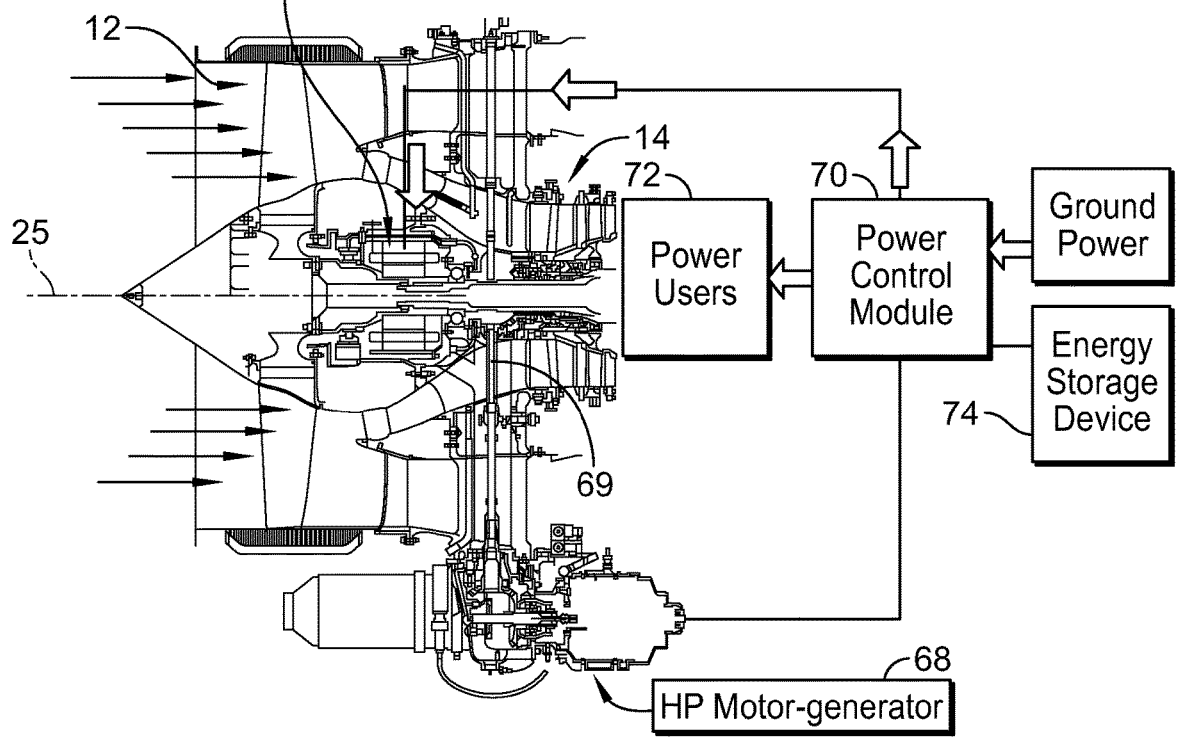
FIG. 14 is a partially diagrammatic view of the turbofan gas turbine engine of FIGS. 1 and 7-13 showing that the power control module is electrically connected to ground power source and determines that cool engine off operational conditions exist in which the engine is desirably shut down and remains at relatively cool temperature and in the power control module operates the low pressure motor-generator in the drive mode to inhibit rotation of the fan rotor to prevent rotation of the engine.

In the illustrative embodiment as shown in FIG. 14, the power control module 70 operates the LP motor-generator 38 to inhibit rotation of the fan 12 while the engine 10 is powered off. The power control module 70 is illustratively connected to a stationary power source as indicated by ground power 113. The power control module 70 illustratively directs power from the ground power 113 to the LP motor-generator 38 to inhibit rotation of the fan 12. Such operation can prevent accidental rotation of the engine 10 components from natural wind which can be damaging without operation of the engine 10.

In the illustrative embodiment, the power control module 70 determines the operational conditions based on signals received from various engine components. The various engine components illustratively include at least rotational speed sensors configured to detect the rotational speed of the LP and HP spools, compressor input and output pressure sensors adapted to determine inlet and outlet pressures of the compressor 14. In some embodiments, the various engine components may include any of compressor surge margin sensors adapted to detect the amount of operating margin between the current compressor operating pressure and a compressor surge pressure, fuel rate sensors, and/or efficiency sensors (including at least temperature and pressure sensors for determining differentials across the LP turbine rotor 20 and HP turbine rotor 22) adapted to determine operating efficiency of the HP spool 26 and LP spool 30. In some embodiment, the engine 10 may include any number and/or arrangement of sensors for detecting and/or determining current operational parameters. In some embodiment, the 3-phase power arrangement may be used to determine LP shaft 32 speed indirectly.

Figure 15:
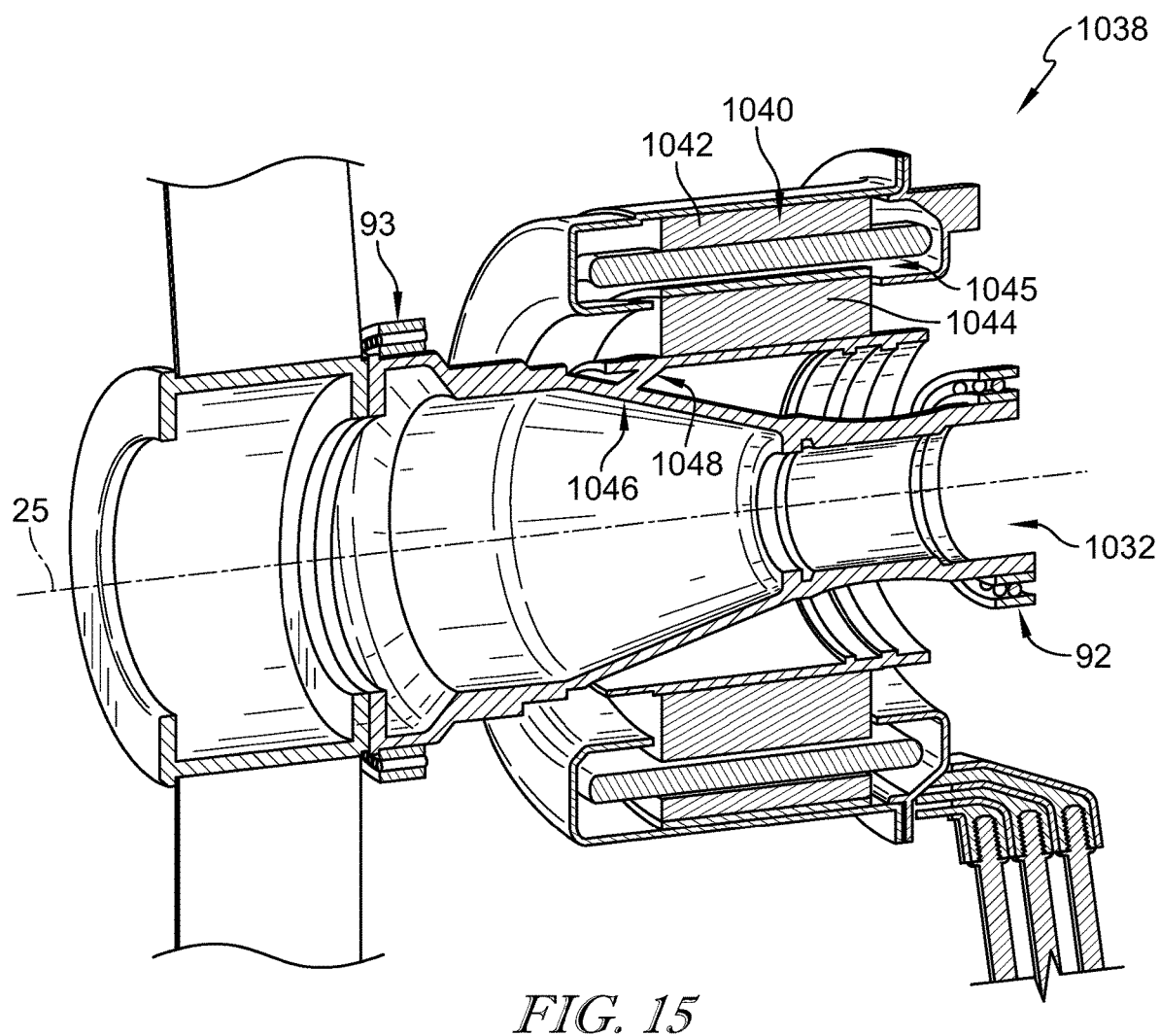
FIG. 15 is a perspective view of a cross-section of another illustrative embodiment of the low pressure electric motor-generator of the turbofan gas turbine engine of FIG. 1 taken along the plane 2-2 and showing that the low pressure drive shaft includes a fan shaft and a quill shaft that is rotationally coupled to the fan shaft and extends from the fan shaft to rotationally connect the fan shaft and the rotor of the low pressure motor-generator for rotation.

In another illustrative embodiment as shown in FIG. 15, the gas turbine engine 10 includes low pressure (LP) motor-generator 1038 having a motor-generator core 1040 configured for selective operation between a generation mode to generate electrical power from rotation of the LP turbine 22 and in a drive mode to receive electrical power for applying rotational force to a LP drive shaft 1032. The LP motor-generator 1038 is similar to the LP motor-generator 38 as disclosed herein. Accordingly, similar reference numbers in the 1000 series indicate features that are common between the LP motor-generator 1038 and the LP motor-generator 38 unless indicated otherwise. The description of the LP motor-generator 38 is hereby incorporated by reference to apply to the LP motor-generator 1038 except in instances of conflict with the specific disclosure of the LP motor-generator 1038.

The LP drive shaft 1032 illustratively includes a fan shaft 1046 including a generator mount 1048 that extends radially from the fan shaft 1046 to support the motor-generator core 1040. In the illustrative embodiment, the motor-generator mount 1048 is fixedly connected with the fan shaft 1046 both in rotation and radial movement. The motor-generator core 1040 illustratively includes a stator 1042 and a permanent magnet rotor 1044 that can operate in electromagnetic communication with the stator 1042 with radial spacing 1045 between the rotor 1044 and the stator 1042.

Unlike the LP motor-generator 38, the LP motor-generator 1038 does not include bearings 152, 154 independent from the shaft bearings 92, 93. Upon degradation and/or failure of any of the shaft bearings 92, 93 such that the fan shaft 1046 does not rotate concentrically with the axis 25 such that the radial spacing 1045 is relatively large, the LP motor-generator 1038 is adapted to continue to support operation despite the increase in radial spacing 1045.

In some embodiments, the motor-generators disclosed herein may be configured for operation in only one of a power mode and/or a generator mode.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbofan gas turbine engine for use in an aircraft, the engine comprising
    a low pressure spool including a fan rotor arranged at a forward end of the engine, a low pressure turbine rotor arranged at an aft end of the engine, a low pressure drive shaft extending along an axis and rotationally coupling the fan rotor to receive driven rotation from the low pressure turbine rotor,
    a high pressure spool including a compressor rotor, a high pressure turbine rotor, and a high pressure drive shaft extending along the axis and rotationally coupling the compressor rotor to receive driven rotation from the high pressure turbine rotor, and
    an electric generator positioned axially between the fan rotor and the compressor rotor along the axis, the electric generator including a generator core having a stator arranged about the low pressure drive shaft and a generator rotor rotationally coupled to the low pressure drive shaft radially inward of the stator, a generator housing that receives the stator of the electric generator, a forward bearing arranged forward of the stator that is engaged between the generator rotor and the generator housing, and an aft bearing arranged aft of the stator that is engaged between the generator rotor and the generator housing,
    wherein the low pressure drive shaft includes a first shaft coupled for rotation with the fan rotor and a second shaft that extends from the first shaft to the generator rotor of the electric generator, the second shaft includes a number of radially-outwardly extending splines that engage with a number of splines of the generator rotor to couple the generator rotor to the second shaft for rotation therewith, and the second shaft has a flange with a frustoconical shape extending radially outward and axially between the first shaft and the electric generator.

2. The engine of claim 1, wherein the second shaft includes a number of splines extending radially inward that engage with a number of splines of the first shaft to rotationally couple the second shaft and the first shaft.

3. The engine of claim 1, wherein the first shaft includes a first bearing and a second bearing each arranged to support the first shaft for rotation about the axis, and the electric generator is arranged axially between the first bearing and the second bearing.

4. The engine of claim 1, wherein the generator housing has a shaft opening defined axially therethrough, the generator housing includes a can receptacle and a cover attached to an end of the can receptacle, and the generator housing defines an internal cavity for receiving the stator of the generator core.

5. The engine of claim 1, wherein the electric generator comprises a motor-generator selectively operable in a first mode to generate electrical power from driven rotation and in a second mode to drive rotation of the low pressure drive shaft by receiving electrical power.

6. The engine of claim 1, wherein the high pressure turbine spool includes an auxiliary shaft coupled to the high pressure drive shaft to receive driven rotation.

7. A gas turbine engine for use in an aircraft, the engine comprising
    a low pressure spool including an output rotor with blades arranged at a forward end of the engine configured to accelerate air upon rotation of the blades, a low pressure turbine rotor arranged at an aft end of the engine, a low pressure drive shaft extending along an axis and rotationally coupling the output rotor to receive driven rotation from the low pressure turbine rotor,
    a high pressure spool including a compressor rotor, a high pressure turbine rotor, and a high pressure drive shaft extending along the axis and rotationally coupling the compressor rotor to receive driven rotation from the high pressure turbine rotor, and
    a low pressure generator positioned axially forward of the compressor rotor along the axis, the low pressure generator including a generator core having a stator arranged about the low pressure drive shaft and a generator rotor rotationally coupled to the low pressure drive shaft radially inward of the stator, a generator housing that receives the stator of the low pressure generator, a forward bearing arranged forward of the stator that is engaged between the generator rotor and the generator housing, and an aft bearing arranged aft of the stator that is engaged between the generator rotor and the generator housing,
    wherein the low pressure drive shaft includes a first shaft coupled for rotation with the output rotor and a second shaft that extends from the first shaft to the generator rotor of the low pressure generator, the second shaft has a number of extending splines that engage with a number of splines included in one of the generator rotor and the first shaft, and the second shaft has a flange with a frustoconical shape extending radially outward and axially between the first shaft and the low pressure generator.

8. The engine of claim 7, wherein the second shaft includes a number of radially-outwardly extending splines that engage with a number of splines of the generator rotor to couple the generator rotor to the second shaft for rotation therewith.

9. The engine of claim 7, wherein the second shaft includes a number of splines extending radially inward that engage with a number of splines of the first shaft to rotationally couple the second shaft and the first shaft.

10. The engine of claim 7, wherein the first shaft includes a first bearing and a second bearing each arranged to support the first shaft for rotation about the axis, and the low pressure generator is arranged axially between the first bearing and the second bearing.

11. The engine of claim 7, wherein the generator housing has a shaft opening defined axially therethrough, the generator housing includes a can receptacle and a cover attached to an end of the can receptacle, and the generator housing defines an internal cavity for receiving the stator of the generator core.

12. The engine of claim 7, wherein the low pressure generator comprises a motor-generator selectively operable in a first mode to generate electrical power from driven rotation and in a second mode to drive rotation of the low pressure drive shaft by receiving electrical power.

13. The engine of claim 7, wherein the high pressure turbine spool includes an auxiliary shaft coupled to the high pressure drive shaft to receive driven rotation.

14. An aircraft comprising
an airframe, and
a gas turbine engine including:
a low pressure spool including an output rotor with blades arranged at a forward end of the engine configured to accelerate air upon rotation of the blades, a low pressure turbine rotor arranged at an aft end of the engine, a low pressure drive shaft extending along an axis and rotationally coupling the output rotor to receive driven rotation from the low pressure turbine rotor,
a high pressure spool including a compressor rotor, a high pressure turbine rotor, and a high pressure drive shaft extending along the axis and rotationally coupling the compressor rotor to receive driven rotation from the high pressure turbine rotor, and
a low pressure generator positioned axially forward of the compressor rotor along the axis, the low pressure generator including a generator core having a stator arranged about the low pressure drive shaft and a generator rotor rotationally coupled to the low pressure drive shaft radially inward of the stator, a generator housing that receives the stator of the low pressure generator, a forward bearing arranged forward of the stator that is engaged between the generator rotor and the generator housing, and an aft bearing arranged aft of the stator that is engaged between the generator rotor and the generator housing,
wherein the low pressure drive shaft includes a first shaft coupled for rotation with the output rotor and a second shaft that extends from the first shaft to the generator rotor of the low pressure generator, the second shaft has a number of extending splines that engage with a number of splines included in one of the generator rotor and the first shaft, and the second shaft has a flange with a frustoconical shape extending radially outward and axially between the first shaft and the low pressure generator.

15. The aircraft of claim 14, wherein the second shaft includes a number of radially-outwardly extending splines that engage with a number of splines of the generator rotor to couple the generator rotor to the second shaft for rotation therewith.

16. The aircraft of claim 14, wherein the second shaft includes a number of splines extending radially inward that engage with a number of splines of the first shaft to rotationally couple the second shaft and the first shaft.

17. The aircraft of claim 14, wherein the low pressure generator comprises a motor-generator selectively operable in a first mode to generate electrical power from driven rotation and in a second mode to drive rotation of the low pressure drive shaft by receiving electrical power.

18. The aircraft of claim 14, wherein the gas turbine engine includes a high pressure motor-generator coupled to the high pressure spool to be driven by the high pressure drive shaft.

19. The aircraft of claim 18, wherein the output rotor is provided by a turbofan.

* * * * *